(12) United States Patent
Allers

(10) Patent No.: US 10,926,913 B2
(45) Date of Patent: Feb. 23, 2021

(54) VENTED TRI-FOLD CONTAINERS

(71) Applicant: Genpak, LLC, Charlotte, NC (US)

(72) Inventor: Brian S. Allers, Fort Mill, SC (US)

(73) Assignee: Genpak, LLC, Charlotte, NC (US)

( * ) Notice: Subject to any disclaimer, the term of this patent is extended or adjusted under 35 U.S.C. 154(b) by 137 days.

(21) Appl. No.: 16/139,981

(22) Filed: Sep. 24, 2018

(65) Prior Publication Data
US 2020/0095009 A1    Mar. 26, 2020

(51) Int. Cl.
*B65D 1/24* (2006.01)
*B65D 43/16* (2006.01)
*A47J 47/10* (2006.01)
*B65D 21/02* (2006.01)

(52) U.S. Cl.
CPC .............. *B65D 1/24* (2013.01); *B65D 43/162* (2013.01); *A47J 47/10* (2013.01); *B65D 21/0209* (2013.01); *B65D 43/161* (2013.01); *B65D 2543/00296* (2013.01)

(58) Field of Classification Search
CPC ....... A47J 47/10; B65D 1/24; B65D 21/0209; B65D 2543/00296; B65D 43/161; B65D 43/162
USPC ................................ 220/380, 4.26, 520, 781
See application file for complete search history.

(56) References Cited

U.S. PATENT DOCUMENTS

| 4,951,866 | A | 8/1990 | Rusnak |
| 5,323,926 | A | 6/1994 | Pomroy et al. |
| 5,462,192 | A | 10/1995 | Pomroy |
| 5,671,846 | A | 9/1997 | Frank |
| 5,950,834 | A | 9/1999 | Woodnorth et al. |
| 6,164,442 | A | 12/2000 | Stravitz |
| 6,386,440 | B1 | 5/2002 | Tulkoff |
| 6,752,311 | B2 | 6/2004 | Tulkoff |
| 6,981,593 | B1 | 1/2006 | Klodt |
| D516,388 | S | 3/2006 | Wells |
| D555,475 | S | 11/2007 | Enriquez et al. |
| D601,040 | S | 9/2009 | Vovan et al. |
| 7,775,364 | B1 | 8/2010 | Archambault et al. |
| 7,850,005 | B2 | 12/2010 | Bras et al. |
| 7,968,132 | B2 | 6/2011 | Archie |
| 8,251,249 | B1 | 8/2012 | Vovan |
| D668,555 | S | 10/2012 | Archie et al. |

(Continued)

FOREIGN PATENT DOCUMENTS

WO    03/013232    2/2003
WO    2006/036792    4/2006

(Continued)

OTHER PUBLICATIONS

Pactiv's Burger Dome flyer (2015).

*Primary Examiner* — James N Smalley
*Assistant Examiner* — Madison L Poos
(74) *Attorney, Agent, or Firm* — Laurence & Phillips IP Law

(57) ABSTRACT

A vented tri-fold container includes a base, a lid, a divider, two hinges, and at least one vent. The tri-fold container may be configured to be vertically stackable in the open configuration and also when closed. When closed, heat and/or moisture may be vented from the containers even when multiple containers are stacked together. The lid and the divider of the vented tri-fold container may cooperate to form a moisture capture area within the container when the tri-fold container is closed.

22 Claims, 9 Drawing Sheets

(56) References Cited

U.S. PATENT DOCUMENTS

| | | | |
|---|---|---|---|
| D679,198 S | 4/2013 | O'Connor et al. | |
| 9,038,840 B2 | 5/2015 | Umholtz | |
| 9,180,997 B2 | 11/2015 | Melistas | |
| 2003/0026875 A1 | 2/2003 | Aguilar et al. | |
| 2003/0026876 A1 | 2/2003 | Albuja et al. | |
| 2004/0026430 A1 | 2/2004 | Baker et al. | |
| 2005/0247596 A1 | 11/2005 | Manley et al. | |
| 2006/0068063 A1 | 3/2006 | Zerfas et al. | |
| 2007/0199841 A1 | 8/2007 | Mesalic | |
| 2008/0245096 A1 | 10/2008 | Hanson et al. | |
| 2009/0039076 A1 | 2/2009 | Maslowski et al. | |
| 2010/0006578 A1 | 1/2010 | Roth et al. | |
| 2010/0065461 A1* | 3/2010 | Chhay | B65D 21/0222 206/505 |
| 2011/0121002 A1 | 5/2011 | Stiller et al. | |
| 2011/0215023 A1 | 9/2011 | Archie et al. | |
| 2011/0215097 A1 | 9/2011 | Archie et al. | |
| 2012/0312820 A1* | 12/2012 | Cadiente | B65D 51/1611 220/367.1 |
| 2014/0332527 A1 | 11/2014 | Judd et al. | |

FOREIGN PATENT DOCUMENTS

| | | |
|---|---|---|
| WO | 2010/006038 | 1/2010 |
| WO | 2011/112284 | 9/2011 |
| WO | 2011/112285 | 9/2011 |
| WO | 2013/071350 | 5/2013 |

\* cited by examiner

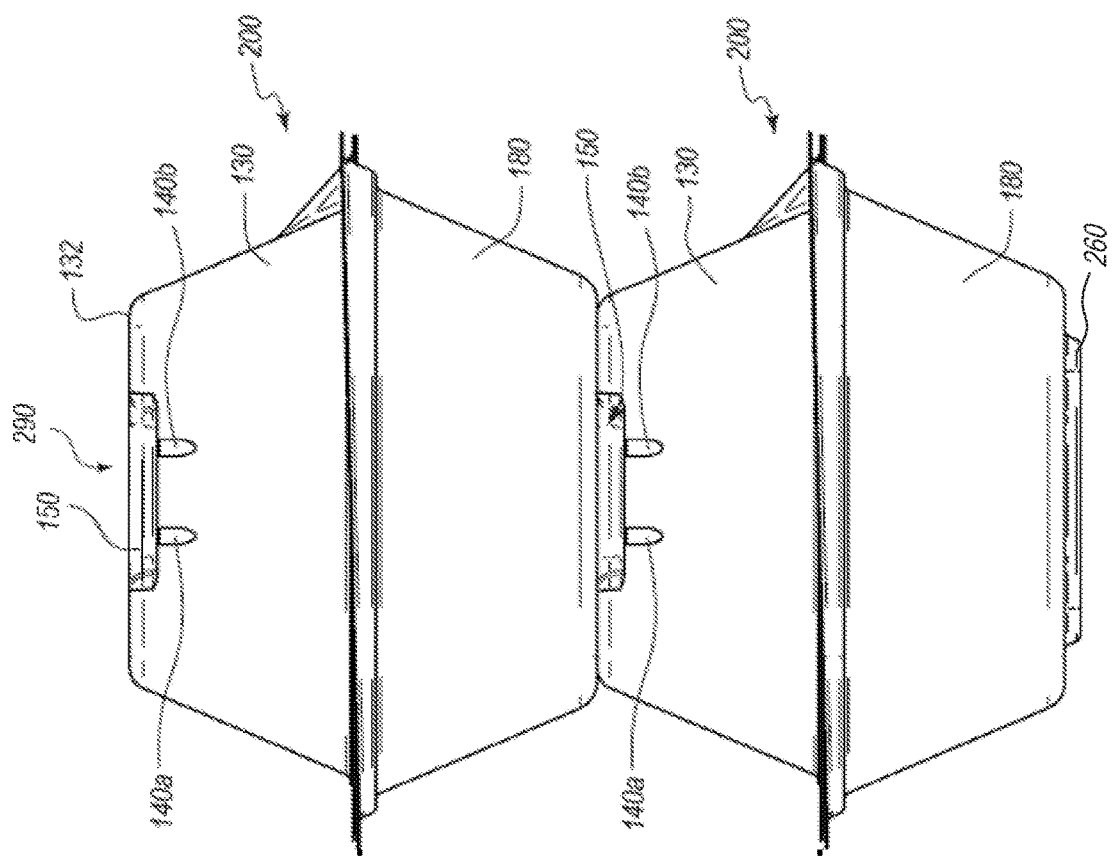
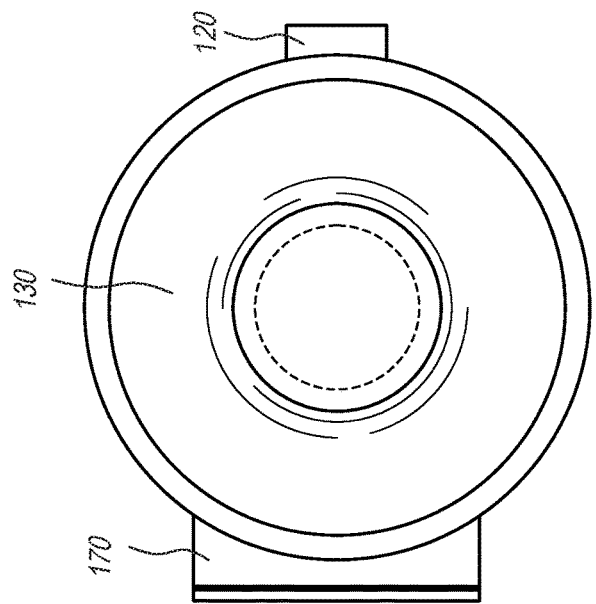
FIG. 9B
FIG. 9A

VENTED TRI-FOLD CONTAINERS

FIELD OF THE INVENTION

The present disclosure generally relates to vented containers having three sections.

BRIEF DESCRIPTION OF THE DRAWINGS

The written disclosure herein describes illustrative embodiments that are non-limiting and non-exhaustive. Reference is made to certain of such illustrative embodiments that are depicted in the figures, as listed below.

FIG. 9A is a perspective view from the side of an additional embodiment of two vented tri-fold containers that are stacked together.

FIG. 9B is a perspective view from the top of an embodiment of a vented tri-fold container that is circular.

Figure 1:
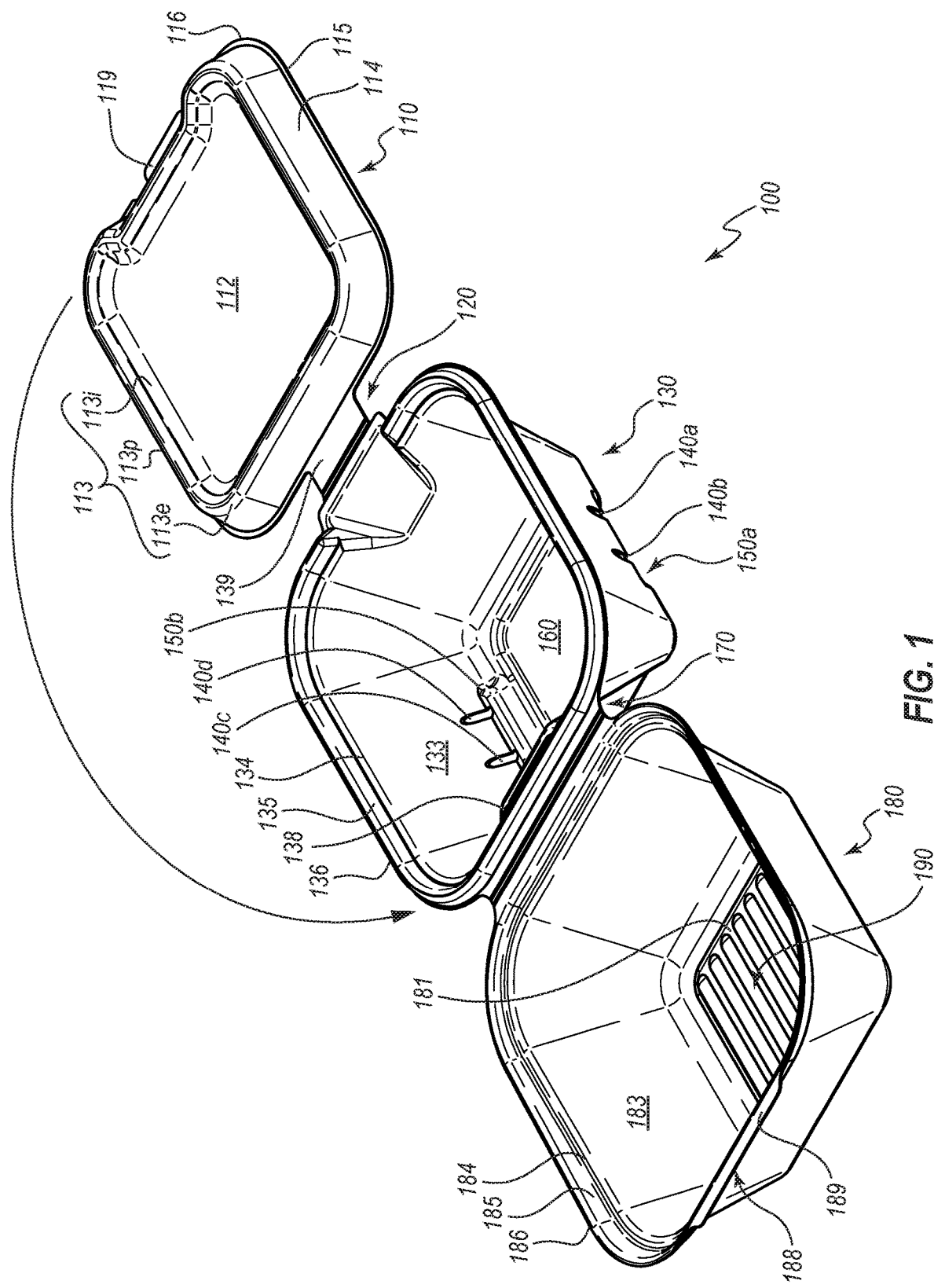
FIG. 1 is a perspective view of an embodiment of a vented tri-fold container in an open configuration, prior to folding.

It should be noted that these figures are intended to illustrate the general characteristics of methods, structure and/or materials utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by exemplary embodiments. For example, the relative thicknesses and positioning of components may be reduced or exaggerated for clarity. The use of similar or identical reference numbers in the various drawings is intended to indicate the presence of a similar or identical element or feature.

DETAILED DESCRIPTION OF EXEMPLARY EMBODIMENTS

The inventive concepts will now be described more fully hereinafter with reference to the accompanying drawings, in which exemplary embodiments of the inventive concepts are shown. The advantages and features of the inventive concepts and methods of achieving them will be apparent from the following exemplary embodiments that will be described in more detail with reference to the accompanying drawings. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts. In the drawings, embodiments of the inventive concepts are not limited to the specific examples provided herein. The same reference numerals or the same reference designators denote the same elements throughout the specification.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Moreover, exemplary embodiments are described herein with reference to cross-sectional views, perspective views, and/or top or plan views that are idealized exemplary views. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an edge may be illustrated with sharp ends and without rounded or curved features even though such rounded or curved features may be preferable. Thus, the regions or elements illustrated in the figures may be schematic in nature and their shapes may not illustrate the actual shape of a region or an element of a container and are not intended to limit the scope of example embodiments.

The embodiments disclosed herein relate to containers that may be used, for example, in the food industry. In particular, certain embodiments disclosed herein relate to vented containers having three sections that may be used for storing and/or transporting food products.

Food containers can be used by consumers for packaging take-out items and/or leftovers. Such containers may contain hot food, which may warm the air within the container. The warm air in turn may cause moisture to condense onto the cooler sides and/or top of the container, which can drip onto the food. While condensation may not affect the quality of all hot food, items such as fried goods can become soggy upon exposure to such moisture. For example, if the hot food includes french fries and a hamburger with a bun, any condensation that forms can dampen the bun, rendering it unappetizing and/or unable to be held to physically support the hamburger for convenient consumption.

Restaurants and other users of food packaging, such as grocery stores, delis and take-out delivery services, use containers to package a variety of food products having a variety of temperatures. Ideally, as few containers as possible are used to package all of the food products, the containers also being compact when open and closed, economically and/or environmentally appealing, and able to maintain the quality and temperature of the food product stored inside. Such containers should also be easy to load with food and be efficiently designed, such as being readily foldable and/or able to hold multiple different food products, including foods that are routinely purchased together such as hamburgers or hot dogs and french fries. In addition, conventional food containers are generally sufficiently air-tight that a venting mechanism may be beneficial to release the warm air from the interior of the container to avoid undesirable condensation from affecting the food product and/or to maintain the mechanical stability of the container.

A general-use container that can be stored efficiently and may be filled with more than one food product would be advantageous. The container should be easy to use and designed such that any condensation that forms from hot food contents will not adversely affect the quality of the food products contained therein. Additionally, it would be beneficial for the container be stackable, including when closed and loaded with hot food, but also still allow heat and/or moisture to vent from each of the containers when multiple containers are stacked together.

Disclosed herein are such vented containers, referred to as "tri-fold" containers because they have three sections that fold together to form two compartments when the container is closed. These vented tri-fold container may be readily manipulated to contain two different food products at varying temperatures. The design of the disclosed vented tri-fold containers permits the containers to be efficiently nested together when open, and multiple closed containers may be stacked together while maintaining their venting capacity.

Figure 2:
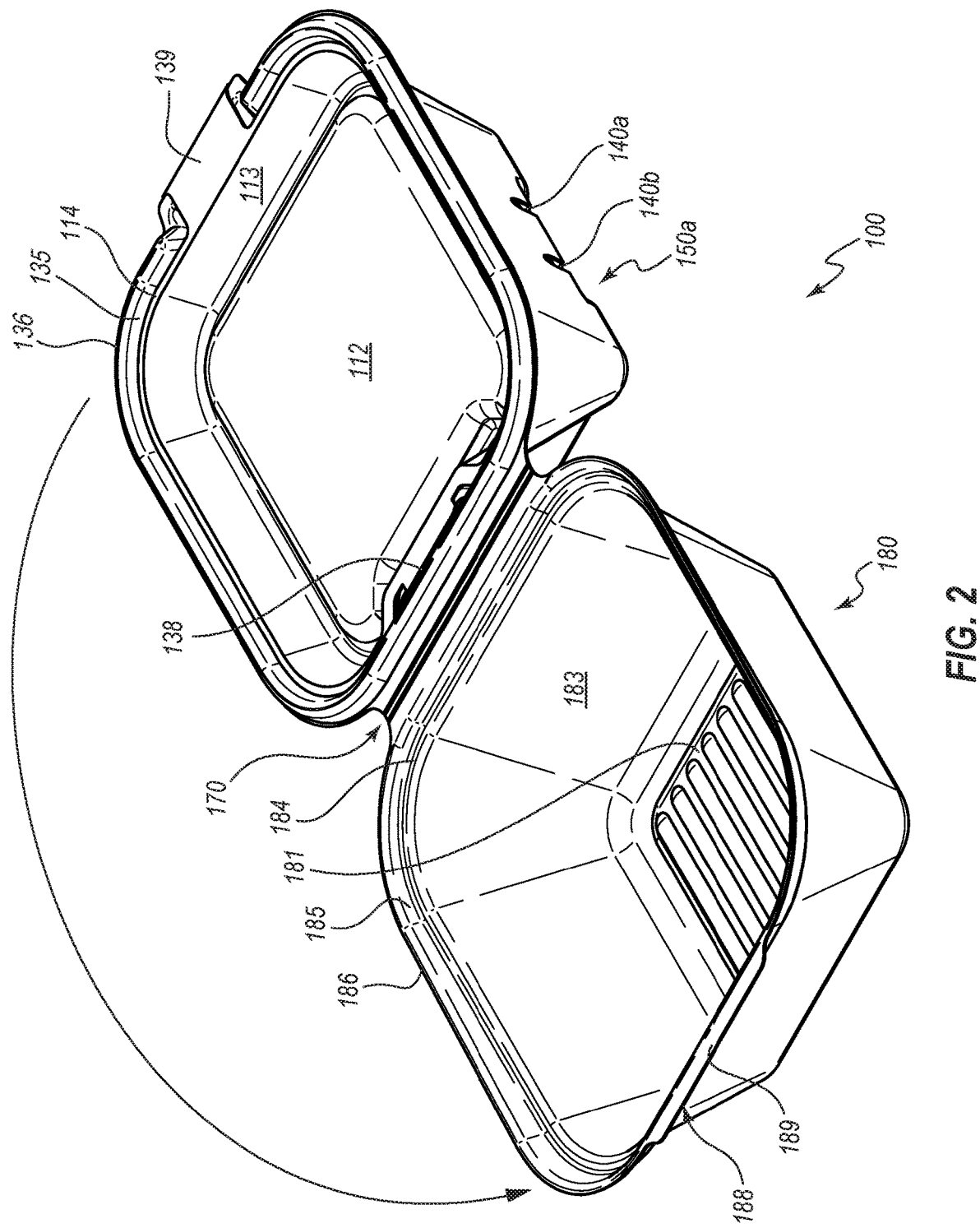
FIG. 2 is a perspective view of the container of FIG. 1 after the divider has been folded to overlay the lid, in a partially closed configuration.
Figure 3:
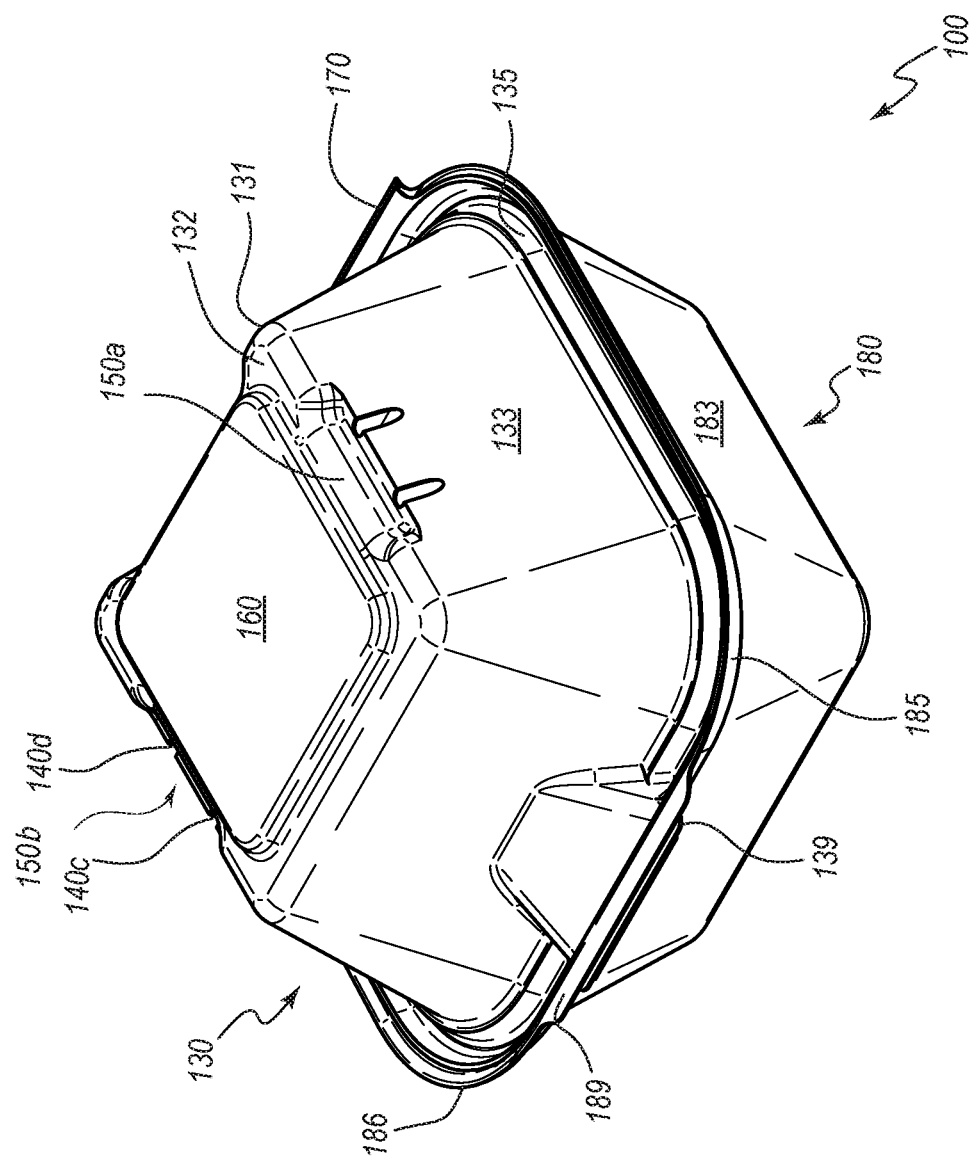
FIG. 3 is a perspective view of the container of FIG. 1 after the lid and the divider have been folded to overlay the base, in a closed configuration.

Certain embodiments of the vented tri-fold containers as disclosed herein can advantageously be supplied to a user in an open, preloaded configuration as shown, for example, in FIG. 1. The user can load food into one section of the container with a first desired food product, such as hot french fries. The user can then partially close the container into an intermediate configuration by folding the divider onto the base as shown in FIG. 2, thereby forming an upper interior vented compartment within the container. A user can then load a second food product into the bottom section of the container, and can then close the container completely by folding the lid and the divider up and onto the base as shown in FIG. 3, thereby enclosing the lower interior compartment. When the container is closed, the three sections form two separated compartments with one compartment being vented, to hold two different food products and/or food products having two different temperatures.

Figure 8:
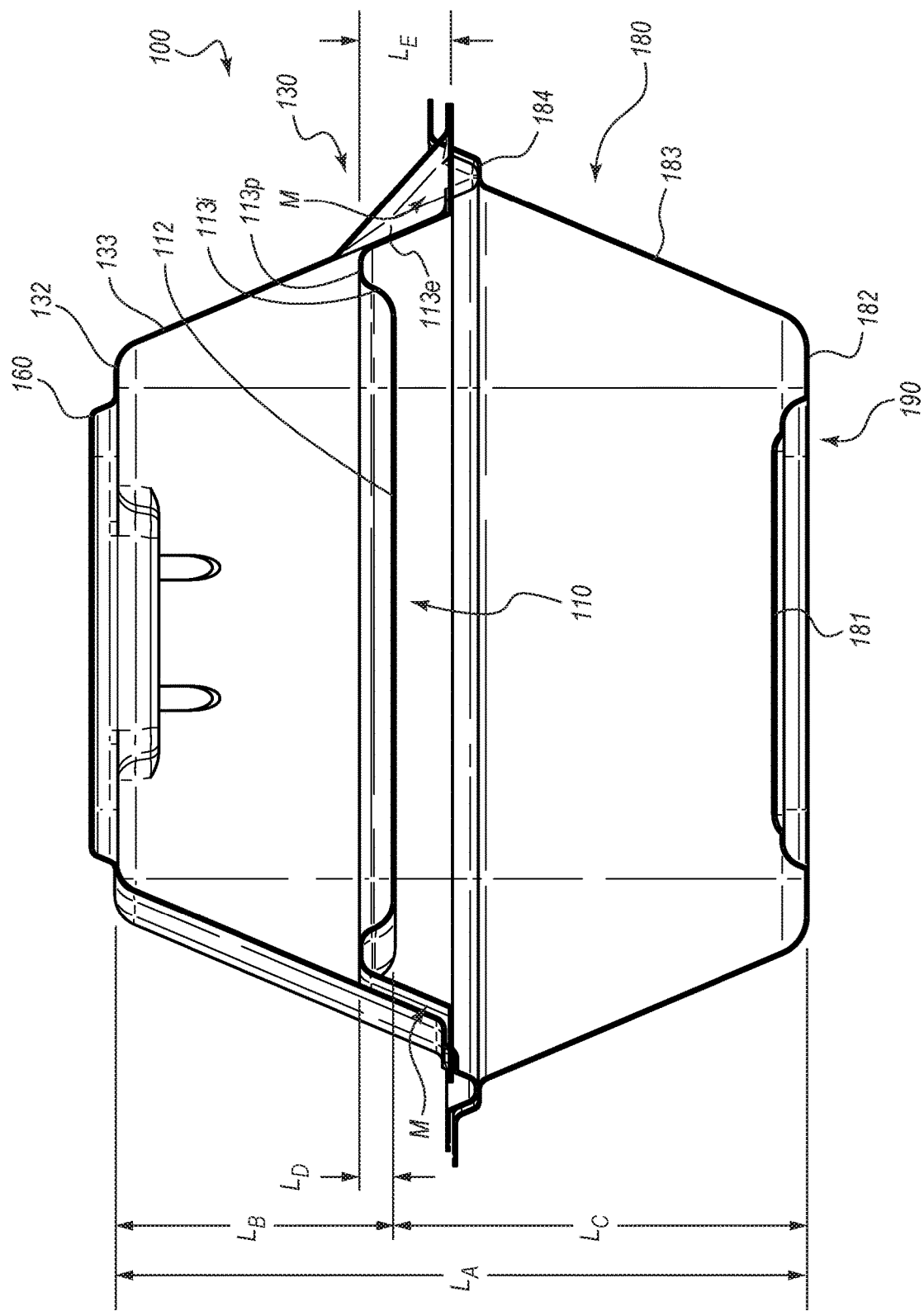
FIG. 8 is a cross-sectional side view of the container of FIG. 1 in a closed configuration.

The tri-fold container includes a vent or multiple vents configured to release moisture vapor that may form when a hot item is placed into the container. The vent allows heat and/or moisture to move from the interior of the closed container to the external environment. In addition, the tri-fold container may have a lid and a divider that may form a moisture capture area, which is best seen in FIG. 8, to trap and/or collect condensation that forms on the interior of the lid, and keep the condensation separated from the food packaged in the container when the container is closed.

Accordingly, in some embodiments, an end user (e.g., the consumer) can ultimately access multiple foods having different temperatures from a container that vents warm air from the interior of the container even when multiple containers are stacked together. Embodiments of the vented tri-fold containers are stackable in either the open or closed configuration. Further details of embodiments of the disclosed vented tri-fold containers are provided below.

FIGS. 1-6 depict a vented tri-fold container 100 with several primary components or elements including a divider 110, a hinge 120 attached to the divider 110 and connecting the divider 110 to a lid 130, a pair of vents 140a and 140b in a recess 150a in the lid 130, another pair of vents 140c and 140d in a recess 150b in the lid 130, a stacking protrusion 160 in the lid 130, a hinge 170 that connects the lid 130 to a base 180, and a stacking receptacle 190. The vented tri-fold containers may have any suitable shapes, such as those that are round, oval, rectangular, and irregular shapes.

Additionally, the vented tri-fold containers may have any suitable size. For example, the vented tri-fold containers may hold volumes ranging from 4 ounces through 64 ounces.

Other embodiments of vented tri-fold containers, such as a tri-fold container 200 depicted in FIGS. 9A and 9B, may resemble the tri-fold container 100 discussed above with respect to FIG. 1. It will be appreciated that the illustrated embodiments may have analogous features. Accordingly, like features are designated with like reference numerals, with the leading digits incremented to "1" "or "2". Relevant disclosure set forth above regarding similarly identified features thus may not be repeated hereafter. Moreover, specific features of the container and related components shown in FIGS. 9A and 9B may not be shown or identified by a reference numeral or specifically discussed in the written description that follows. However, such features may clearly be the same, or substantially the same, as features depicted in other embodiments and/or described with respect to such embodiments. Accordingly, the relevant descriptions of such features apply equally to the features of the containers, such as stacking receptacle 190 and stacking receptacle 290. Any suitable combination of the features, and variations of the same, described with respect to the container 100 and components illustrated in FIG. 1 can be employed with the other container 200 and its components illustrated in FIG. 9, and vice versa. This pattern of disclosure applies equally to further embodiments depicted in subsequent figures and described hereafter.

FIG. 1 depicts an embodiment of a vented tri-fold container 100 shown in an open configuration. The container 100 is shown in a partially closed configuration in FIG. 2 and a completely closed configuration in FIG. 3. With reference to FIGS. 1-8, the container 100 includes a divider 110 having a central area 112; a ridge 113 having an interior side 113i, a peak 113p, and an exterior side 113e; a divider connection interface 114; a divider flange 115; a divider free edge 116; and a divider tab 119. The container also includes a lid 130 having a top end 131, a lid platform 132, a lid sidewall 133, a lid connection interface 134, a lid flange 135, a lid free edge 136, a lid slot 138, a lid tab 139, a pair of vents 140a and 140b in a recess 150a, another pair of vents 140c and 140d in a recess 150b, and a stacking structure (specifically, stacking protrusion 160). The container 100 also includes a base 180 having a bottom end 181, a base platform 182, a base sidewall 183, a base connection interface 184, a base flange 185, a base free edge 186, a base slot 188, a closure element 189, and a stacking structure (specifically, stacking receptacle 190). The closure element 189 secures the lid 130 to the base 180 when the container is closed.

The lid 130 is connected to both the base 180 and the divider 110 of the container 100, and the three sections fold together to transition the container from the open to the closed configuration. For example, in the embodiment illustrated in FIGS. 1-6, the lid 130 is connected to the divider 110 via a hinge 120, and is also connected to the base 180 via a hinge 170 that is positioned opposite hinge 120. To transition the container 100 from the open configuration to a partially closed configuration, the divider 110 is moved in the direction of the arrow shown in FIG. 1 with the divider connection interface 114 abutting the lid connection interface 134 and with divider flange 115 coupled with the lid flange 135. The partially closed configuration of container 100 is illustrated in FIG. 2. Divider tab 119 may be inserted into lid slot 138 to secure the divider 110 to the lid 130, thereby enclosing an upper interior volume within the lid 130.

The divider 110 generally serves to divide the upper compartment of the container generally enclosed by the lid 130, from the lower compartment generally enclosed by the base 180. The divider 110 may be folded onto the open end of the lid 130 after a first food product is loaded into the lid 130, the divider 110 may be secured by the user to enclose the upper compartment in the temporarily inverted lid, and then a second food product may be loaded into the base 180. The temperatures of the first and second food items may differ. The divider 110 physically separates the food product in the upper compartment that may be hotter and/or generate more moisture than the product in the lower compartment, and acts as the bottom surface of the upper compartment until the container is again opened and the food served or consumed.

The size of the divider 110, lid 130 and base 180, and the height of the sidewalls 134 and 184 may vary, including to conform to the intended food products to be packaged therein. For example, a container having a long and narrow lid and base with short sidewalls may be suitable for packaging hot dogs and onion rings, as compared to a container having a square or circular lid and base with tall sidewalls that may be suitable for packaging a hamburger and french fries. In certain embodiments, the height of the lid sidewall 133 may be between about 1 and about 3 inches, between about 1.75 and about 2.75 inches, or between about 2 and about 2.5 inches. In some embodiments, the height of the base sidewall 183 may be between about 1 and about 4 inches, between about 1.5 and about 3 inches, or between about 2.5 and about 3 inches.

The divider 110 includes a central area 112. In some embodiments of container 100, at least a portion of the divider 110 is substantially planar. For example, the majority (that is, more than about half) of the area of the divider may be substantially planar. In the embodiment of container 100 illustrated in FIGS. 1-6, the central area 112 is substantially planar.

The central area 112 transitions to a tab 119 at one end and is otherwise surrounded by a raised ridge 113 along the perimeter of the divider. More particularly, central area 112 extends to the interior side 113i of the ridge 113 and the interior side 113i of ridge 113 transitions to the peak 113p, which then transitions to an exterior side 113e of ridge 113. The peak 113p of ridge 113 may be, in some embodiments, vertically offset from the central area 112. For example, peak 113p may be raised by about 1 to about 10 mm above the predominant plane of the central area 112. The ridge 113 is configured such that when the divider 110 is inverted upon folding about hinge 120 during the transition between the open and the partially closed configurations, the peak 113p of the raised ridge 113 is pointed downward (that is, toward the top end 131 of the lid 130).

Exterior side 113e of ridge 113 transitions to the divider connection interface 114. The divider connection interface 114 transitions to the divider flange 115, which terminates at the divider free edge 116. The divider connection interface 114 and the divider flange 115 have complimentary shapes respectively with the lid connection interface 134 and the lid flange 135 so that the divider 110 may be secured to lid 130.

Divider tab 119 is designed to cooperate with lid slot 138 to further secure the divider 110 to lid 130 after loading a first food product into the lid 130. The divider tab 119 may be inserted into lid slot 138 to secure the divider 110 to the lid 130. When the lid 130 and divider 110 are then together folded about hinge 170 to completely close the container (as shown in FIG. 3), the divider 110 is again inverted such that the peak 113p of the raised ridge 113 points upward to surround, funnel, and/or contain the food item loaded therein toward the central area 112 of the divider 110. The hinge 120 may help to mechanically support and/or integrate with the lid tab 139. Upon inversion of the combined lid/divider about hinge 170 to completely close the container, lid tab 139 may be inserted into base slot 188 to secure the lid 130 with base 180. The hinge 120 may be referred to herein as a divider hinge and the hinge 170 may be referred to as a lid hinge.

The lid 130, in an embodiment, cooperates with the divider 110 to define an upper interior volume of the container 100 when the container 100 is closed. The divider lies between the upper and lower compartments of the container when the container is closed. When the container 100 is closed, the lid flange 135 may abut the divider flange 115. In some embodiments, the divider flange 115 abuts the lid flange 135 and the lid flange 135 abuts the base flange 185 when the container 100 is closed.

The lid 130 may be generally dome-shaped, although other shapes and configurations are possible. In the embodiment depicted in FIGS. 1-6, the lid 130 includes a top end 131, a lid platform 132, a lid sidewall 133, a lid connection interface 134, a lid flange 135, a lid free edge 136, a lid slot 138, a lid tab 139, vents 140a-140d, recesses 150a-b, and stacking protrusion 160. The lid sidewall 133 extends downwardly from the top end 131. The lid sidewall 133 may extend downwardly from the top end 131 in a substantially vertical manner that it is substantially perpendicular to the top end 131. In some embodiments, the lid sidewall 133 may extend downwardly and may be angled radially outwardly. For example, the lid sidewall 133 may extend downwardly in a radially outward direction at an angle of about 5 to about 15 degrees, or from about 5 to about 10 degrees. The lid sidewall 133 may extend downwardly in a curved or arcuate manner. Accordingly, as can be appreciated, the lid sidewall 133 may extend downwardly in a variety of ways depending on the desired shape and characteristics of the container 100. The lid 130 can, in an embodiment, include a lid sidewall 133 that extends downwardly and is angled outwardly from the top end 131.

In reference to FIGS. 1-6, the container 100 includes one or more of a vent 140 that may be configured to release warm air and/or moisture from the interior of the container. In an embodiment, the tri-fold container 100 has a plurality of vents identified at 140a-d. The vent may be a hole in the container (that is, an absence of material), that is configured to permit any moisture vapor or steam to be transferred from the interior of the container to the exterior environment. The vents 140a-d generally extend downwardly from the top end 131 into the lid sidewall 133, toward the lid flange 135. However, the number, shape and placement of the vent 140 is not limited.

The vent 140 may be present in the container 100 as a set of two pairs, as shown in FIG. 3. The vents include a first pair of vents 140a and 140b and a second pair of vents 140c and 140d, with one pair of vents on each of two opposite sides of the lid 130. A pair of vents 140a and 140b are shown in the section encircled at 7 in FIG. 6, and shown enlarged in FIG. 7. The vent may be formed by complete removal of the container material from the vent, which can occur during manufacture of the container such as in a molding process.

In an embodiment, the tri-fold container includes one vent. In additional embodiments, the container has multiple vents. The number and location of the vent on a container 100 may vary depending upon the intended food products to be packaged and/or the size of the container. In an embodiment, the container may include a vent or plurality of vents in only the base. In certain embodiments, a vent or plurality of vents may be included in both the lid and base, or only in the base.

A vent may have an oval or circular shape. A vent may be of any length and width suitable for the tri-fold container 100. For example, the vents 140*a* and 140*b* may be substantially equal in length and width. In an embodiment, each vent is between about 1 mm and about 50 mm long, such as between about 5 mm and about 20 mm long, or about 10 mm long. In some embodiments, each vent is between about 0.1 mm and about 10 mm wide, such as about 0.5 mm wide.

With reference to FIG. 3, the top end 131 and lid platform 132 can have any suitable shape and configuration. The top end 131 can be square in shape with rounded corners that connect the lid platform 132 to the lid sidewall 133. For example, in some embodiments at least a portion of the top end 131 is substantially planar. The lid of embodiments of the vented tri-fold container disclosed herein includes a stacking structure, such as a stacking protrusion, that is configured to be mated with a stacking structure of another tri-fold container to permit the container to be vertically stacked together with other containers. In an embodiment, the lid 130 includes a top end 131 that comprises a stacking protrusion 160. In some embodiments, the stacking protrusion 160 may be vertically offset from the top end 131 in an outward direction. More particularly, the stacking protrusion 160 may be vertically offset from the lid platform 132. In an alternative embodiment, the stacking structure may be a stacking receptacle that is vertically offset relative to the lid platform 132 in an inward direction. Lid platform 132 on top end 131 may extend around a majority, such as around all, of the lid stacking structure.

The top end 131, lid platform 132, and lid sidewall 133 of lid 130 may independently be substantially uniform or flat, or they may comprise one or more features for reinforcement, grip assistance, efficient stacking, venting, etc. For example, in the embodiment illustrated in FIG. 3, the top end 131 comprises a lid platform 132 and stacking protrusion 160, and the lid 130 comprises reinforced rounded corners. The reinforced rounded corners may provide the lid 130 with strength and/or may augment its rigidity.

With reference to FIGS. 1-6, the base 180 may be generally bowl-shaped and may include a bottom end 181, a base platform 182, a base sidewall 183, a base flange 186, a base free edge 187, a base slot 188, and a base stacking structure. The base 180 can have any suitable shape and configuration. For example, in some embodiments at least a portion of the bottom end 181 of base 180 is substantially planar.

The base sidewall 183 extends upwardly from the bottom end 181. In some embodiments, the base sidewall 183 may extend upwardly from the bottom end 181 in a substantially vertical manner that it is substantially perpendicular to the bottom end 181. In other embodiments, the base sidewall 183 may extend upwardly and may be angled radially outwardly. For example, the base sidewall 183 may extend upwardly in a radially outward direction at an angle of about 5 to about 15 degrees, or from about 5 to about 10 degrees. The base sidewall 183 may extend upwardly in a curved or arcuate manner. Accordingly, the base sidewall 183 may extend upwardly in a variety of ways depending on the desired shape and characteristics of the container 100. As illustrated in FIGS. 1-6, the base 180 may, in an embodiment, include a base sidewall 183 that extends upwardly and is angled outwardly from the bottom end 181.

Figure 6:
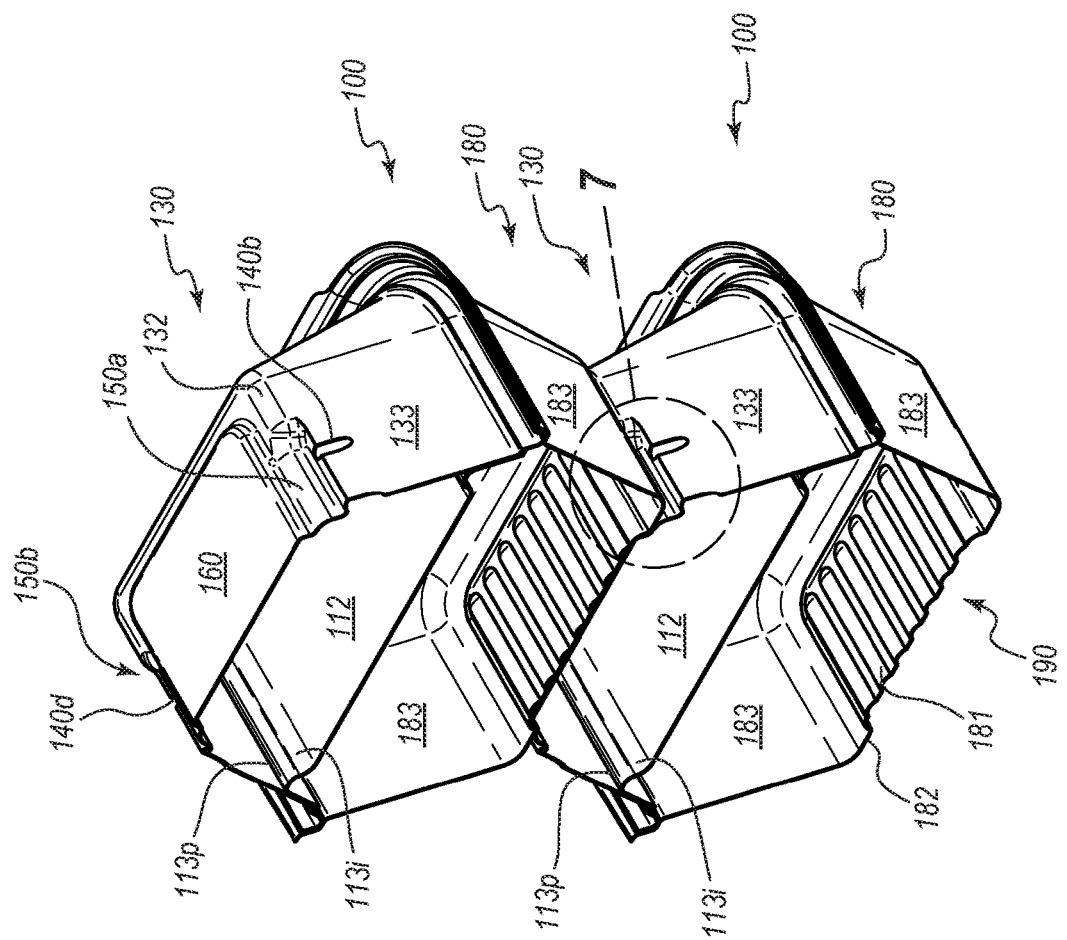
FIG. 6 is a cross-sectional view of the two stacked containers of FIG. 5 taken along cutting line 6-6 of FIG. 5.

The bottom end 181 and base platform 182 may have any suitable shape and configuration. The bottom end 181 may be square in shape with rounded corners that connect the platform 181 to the base sidewall 183. For example, in some embodiments at least a portion of the bottom end 181 is substantially planar. The base of the vented tri-fold container disclosed herein includes a stacking structure, such as a stacking receptacle, that is configured to be mated with a stacking structure of another tri-fold container to permit the container to be stacked together with other tri-fold containers. For example, in an embodiment, the base 180 includes a bottom end 181 that comprises stacking receptacle 190. The stacking receptacle 190 is vertically offset from the bottom end 181 in an inward direction, which may be best appreciated when viewed from the side (FIGS. 6 and 8). In other embodiments, the base stacking structure may include a stacking protrusion that is vertically offset from the base platform in an outward direction. The base platform 182 on bottom end 181 may extend around a majority, such as around all, of the base stacking structure.

The bottom end 181, base platform 182, and base sidewall 183 of base 180 may independently be substantially uniform or flat, or they may comprise one or more features for reinforcement, grip assistance, efficient stacking, venting, etc. In the embodiment illustrated in FIGS. 1-6, the bottom end 181 is ribbed and the base 180 comprises reinforced rounded corners. The ribbing can aid with grasping of the food product by, for example, raising it slightly to allow for fingers or utensils to easily get underneath it, and/or with venting underneath the product. In some embodiments of the containers 100 disclosed herein, at least a portion of the bottom end 131 of the base 180 may be substantially planar. The platform 182 of ribbed bottom end 181 may have a contact surface on the outside of the base 180 and at least a portion of this contact surface may be substantially planar such that the base 180 may readily rest upon a planar surface.

Figure 5:
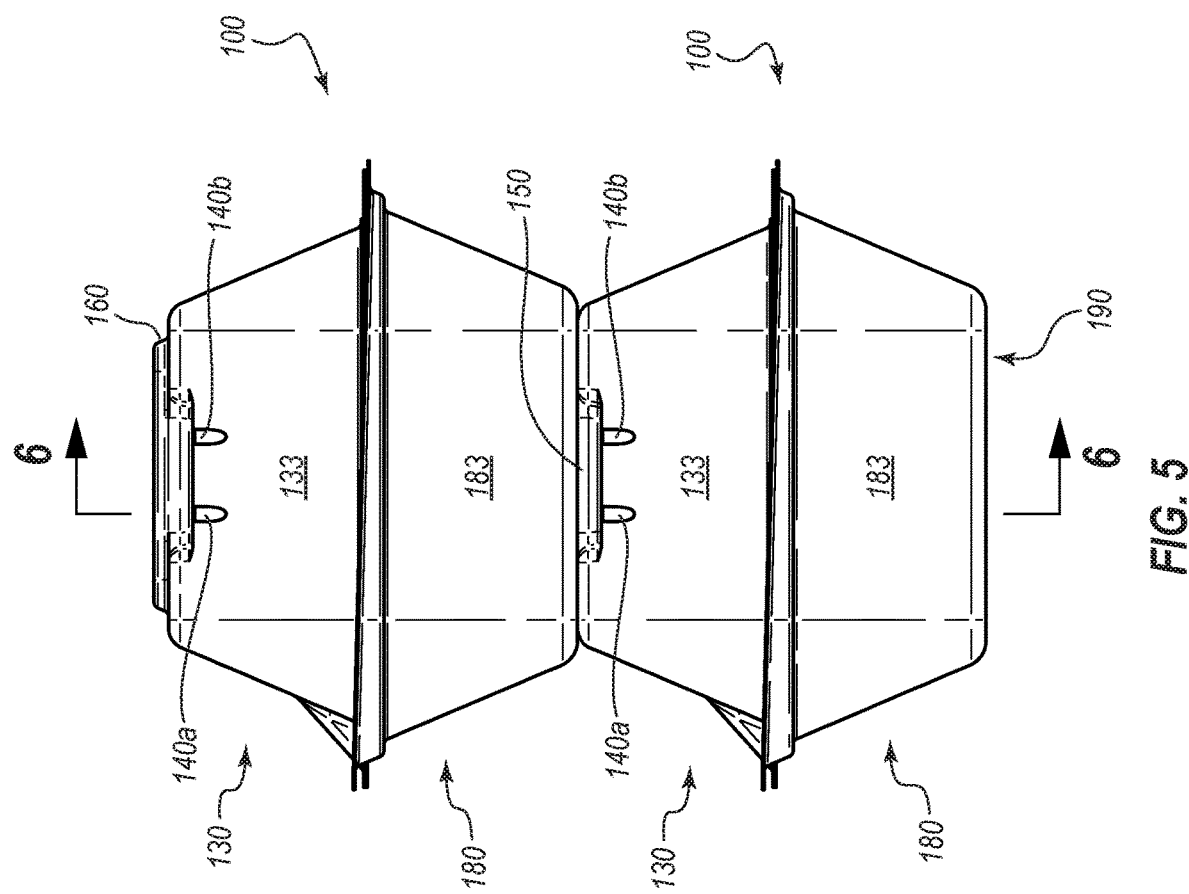
FIG. 5 is a side view of two containers of FIG. 1 in a closed configuration that are stacked together.

With reference to FIGS. 5-6 and 9, embodiments of the tri-fold containers including a stacking structure on either the lid or base, which may be slightly offset from the stacking structure on the cooperative base or lid of a second tri-fold container, permits the containers to be stably stacked upon a planar surface. For example, the top end 131 of the containers may include a cooperative lid platform 132 having a stackable protrusion 160 with a circumference only slightly smaller than the circumference of the stacking receptacle 190 enabling the containers to be packed tightly together when closed, to form a robust stack. In an embodiment, the base platform 182 of bottom end 181 is wider than the lid platform 132 of top end 131.

The stacking structures may have any suitable shape and configuration, such as the elevated rectangular platform in the lid and the recessed rectangular indentation in the base of the container 100 depicted in FIGS. 1-8. For example, the stacking protrusion may have four sides to form a rectangular shape. The stacking protrusion may have rounded corners. In certain embodiments, the stacking protrusion has a rectangular shape and rounded corners.

Both the stacking protrusion and the stacking receptacle may be vertically offset from the end of the container to which they abut, including being vertically offset from a lid and/or base platform. For example, the stacking structure may be vertically offset from the lid and/or base platform by between about 1 and about 10 mm. Similarly, the stacking structure may be vertically offset from the lid and/or base platform by between about 1 and about 10 mm.

Cooperating stacking structures, such as a stacking protrusion 160 on the lid 130 of a first container and a stacking receptacle 190 on the base 180 of a second container, may interact to permit a stable and well-aligned (or vertically straight) stack to be formed. The interaction may include a tightly fitting cooperating stacking structures together, or by having a rimmed edge of one structure click into an indentation in the cooperating structure. The lid stacking structure, in an embodiment, fits in a friction-fit configuration with a base stacking structure of another container. In some embodiments, the friction-fit is strong enough that some force must be applied to separate them, such as by manual separation by hand.

The friction-fit may be strong enough that multiple containers, such as at least three, may be vertically stacked on top of each other to form a stable stack. For example, a plurality of closed containers, such as three, may be vertically stacked together such that the base stacking structure of the first container is mated with the lid stacking structure of the second container, and the base of the second container may be mated with the lid stacking structure of the third container such that the containers may be positioned in a stacked arrangement. In an embodiment, a first container has a lid having a stacking protrusion that fits into a friction-fit configuration with a stacking receptacle of a base of a second container, and the stacking receptacle of the base fits into a friction-fit configuration with a stacking protrusion of a lid of a third container. This arrangement is particularly advantageous when moving multiple stacked containers such as in a vehicle.

Figure 4:
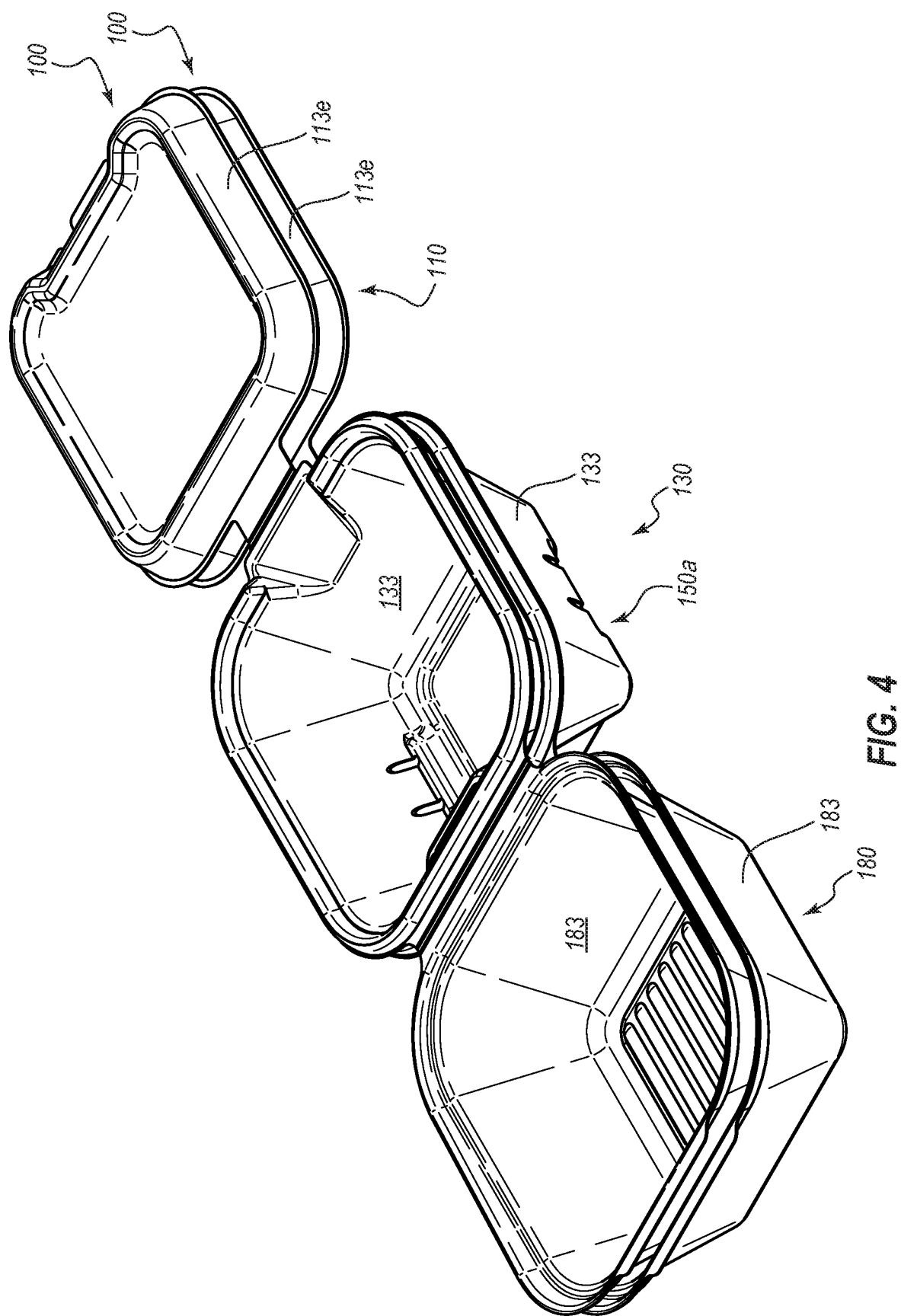
FIG. 4 is a perspective view of two containers of FIG. 1 in an open configuration, showing the containers nested together.

As used herein, the terms "nested" and "nesting" generally refer to more than one of the vented tri-fold containers that are placed on top of each other in an open configuration, such as illustrated in FIG. 4. This is in contrast to the terms "stacked" and "stacking," which generally refer to more than one of the containers that are placed vertically on top of each other in a closed configuration as illustrated in FIGS. 5 and 6. Thus, for example, a plurality of open containers may be configured such that the first container may abut a surface of the second container and the second container may abut a surface of the third container in a nested arrangement.

In an embodiment, the mated stacking structures of a plurality of closed containers in a stacked arrangement have smaller tolerances than the abutting surfaces of the open containers in a nested arrangement. In certain embodiments, a plurality of open containers in a nested arrangement may have the base sidewall of a first container abutting the base sidewall of a second container and the base sidewall of the second container may abut the base sidewall of a third container. Similarly, a lid sidewall of a first container may abut the lid sidewall of a second container and the lid sidewall of the second container may abut the lid sidewall of a third container in a nested arrangement.

In the embodiment of the vented tri-fold container 100 illustrated in FIGS. 1-6, the hinges 120 and 170 are on opposite sides of lid 130. In additional embodiments, however, the hinges 120 and 170 may be on adjoining sides, or on non-opposite sides of the lid 130. For example, in embodiments of a container having a round or circular shape, the hinges 120 and 170 may be positioned at approximately right angles to each other (e.g., approximately ninety degrees apart), or at approximately 120 degrees apart. For example, the container 200, shown in FIG. 9B, has hinges 120 and 170 on opposite sides of lid 130.

The hinges 120 and 170 that connect the lid 130 to the divider 110 and base 180, respectively, may be made from any suitable material that allows for rotation of the sections about the hinge. In some embodiments, the hinge 120 and/or hinge 170 may be made from the same piece of material that the lid 130 and the divider 110 are made from. The lid, the divider, the base, and the two hinges may all be formed from a unitary piece of material.

The length and width of the hinges 120 and 170 may vary to accommodate different loads for, and configurations of, the vented tri-fold containers 100. As used herein, the length of a hinge refers to the length around the perimeter of the container 100 and is collinear with, for example, the lid flange 135 or base flange 185. The width is perpendicular to the length. In embodiments of the containers having a hinge that primarily supports the weight of a heavy food product and/or is used to connect the lid to the base, the hinge may be long and/or have a short width. For a hinge that supports a lightweight food product, the hinge may be shorter in length and/or have a comparatively long width.

The hinges 120 and 170 may each have two portions, an extension portion that is flat and may be configured to extend the hinge over an interface region of the tri-fold container, and a flexing portion that is configured to fold the sections of the container to partially close and/or completely close the container. For example, the extension portion of the hinge 120 illustrated in FIG. 1 includes a longer extension portion that serves to extend the position of the divider 110 in a direction away from hinge 120, and may also provide mechanical support for lid tab 139 (used to secure the lid to the base via closure element 189). As shown in FIG. 2, the extension portion of hinge 120 overlays lid flange 135, such that the divider 110 does not interfere with the lid/base interface. In contrast, hinge 170 has a relatively short extension portion as compared to hinge 120, as the extension portion of hinge 170 serves mainly to align the lid flange 135 with base flange 185 to completely close the container. Hinge 120 may support most of the weight of the food product in the upper volume of the container when transitioning from the partially closed to the completely closed configuration.

The flexing portion of the hinge may include a region of reduced thickness compared to the thickness of the material used for the lid or base, and may be formed by any suitable method. For example, the hinge may be formed by a molding technique referred to as "coining" which involves thinning by deformation of the sheet used to form the container such that the hinge is an area with a thinner cross-section than adjacent portions. In certain embodiments, the hinge is formed by a frangible line, a line of perforation, and/or a region of reduced thickness. The hinge may be formed with a single fold line or with multiple fold lines.

A hinge may extend along the entire length of the side of the container to which it is connected, or it may extend along a portion of the length. For example, the hinge may extend along a minority (that is, less than about half) of the length of the lid and interior sections to which it is connected, as shown for hinge 120 in FIGS. 1-3. In some embodiments, the hinge may extend about at least a majority (that is, more than about half) of the side of the container to which it is connected, as shown for hinge 170 in FIGS. 1-3. For example, the length of the hinge may be about at least about ½, ⅔, or ¾ of the total length of a side (or of a 90 degree angle or quadrant portion, for circular containers) of the container to which it is connected. The length of hinge may be a smaller portion of the length of the container to which it is connected.

In an embodiment, the length of hinge 120 connecting the lid 130 and the divider 110 of container 100 may be between about 0.5 and about 4 inches long. In certain embodiments, the length of hinge 120 may be between about 1 and about 3 inches long, such as between about 1.5 and about 2.5 inches long, or it may be about 2.0 inches long.

In some embodiments, the length of hinge 170 connecting the lid 130 and the base 180 of container 100 may be between about 1 and about 5 inches long. In certain embodiments, the length of hinge 170 connecting the lid 130 and the base 180 may be between about 1 and about 4 inches long, such as between about 1.5 and about 3.5 inches long, between about 2 and about 3 inches long, or it may be about 2.5 inches long.

In the completely closed configuration, the lid 130 and the base 180 may cooperate such that a cavity is defined by the interior volume of the container, or stated otherwise, is enclosed by the lid 130 and the base 180. The divider 130 may further separate the cavity into an upper and a lower section. For example, the top end 131 of lid 130, lid sidewall 133 and the divider 110 together may define a portion of an interior cavity, such as an upper interior volume of the container 100, when the container is in a completely closed configuration. The bottom end 181 of base 180 and the base sidewall 183 can similarly cooperate to define a portion of an interior cavity. The bottom end 181, base sidewall 183 and the divider 110 together may define a lower interior volume of the container 100, when the container is completely closed.

When the container 100 is in the partially closed configuration, the divider 110 and the lid 130 may cooperate to form the upper interior volume, and may be secured upon placement of the divider tab 119 into lid slot 138. When the container 100 is in the completely closed configuration, the divider 110, lid 130, and the base 180 may cooperate to form the lower interior volume, and may be secured by, for example, inserting the lid tab 139 into base slot 188.

The divider 110 and lid 130, and independently the divider 110, lid 130 and base 180, may be configured to sealingly engage with each other at their interfaces 114 and 134 to deter inadvertent opening of the container when the vented tri-fold container is partially closed or completely closed, and/or to limit leakage or loss of the container contents.

The lid flange 135 and lid free edge 136 may contact and rest upon the base interface 184 at the top of base sidewall 183 and base flange 186. The curvature of the lid flange 135 and base flange 185 may cooperate to stabilize the lid-base interface. Similarly, the lid free edge 136 and the base free edge 186 may also cooperate, such as by being of the same height and abutting each other, to stabilize the interface.

When the container is closed, in some embodiments, the base 180 cooperates with lid 130 to define a lower interior volume of the container with the lid flange 135 abutting the base flange 185. The lid 130 may cooperates with the divider 110 to define an upper interior volume of the container with the lid flange 135 abutting the divider flange 115, when the container is closed and/or partially closed. In an embodiment, the lid flange 135 may engage base flange 185 and/or divider flange 115 to provide additional dimensional stability to the container in addition to enclosing the container contents.

In certain embodiments, the lid-base and/or lid-divider interfaces may include divider connection interface 114, lid connection interface 134, and base connection interface 184, each connection interface and its adjacent flange independently having an inverted W-, V- or U-shaped (as viewed in cross-section) cooperative connection that extends around all or some of the circumference of the container. In an embodiment, the divider connection interface 114 extends around a majority of the divider 110. In some embodiments, the lid connection interface 134 extends around a majority of the lid 130 and the base connection interface 184 extends around a majority of the base 180. The interfaces may also extend around the entire perimeter such as base connection interface 184, as shown in FIG. 1.

In a partially closed configuration (e.g., FIG. 2), the lid sidewall 133 engages the divider connection interface 114 upon folding of the divider 110 about hinge 140. The abutting arrangement or interface between the lid sidewall 133 and the divider connection interface 114 may extend about the entire periphery of the lid 130. In various embodiments, the lid-divider abutment or interface may extend about at least ½, ⅔, or ¾ of a total periphery of the lid 130, or the lid-divider interface or abutment may extend around a smaller portion of the lid 130.

In a completely closed configuration (e.g., FIG. 3), the lid sidewall 133 engages the base sidewall 183 upon folding of the lid 130 about hinge 170, to cause the lid 130 to rest on the base 180. The abutment between the lid connection interface 134 and the base connection interface 184 may extend about the entire periphery of the base 180. In various embodiments, the lid-base abutment may extend about at least ½, ⅔, or ¾ of a total periphery of the base sidewall 183, or the lid-base abutment may extend around a smaller portion of the base sidewall 183.

Figure 7:
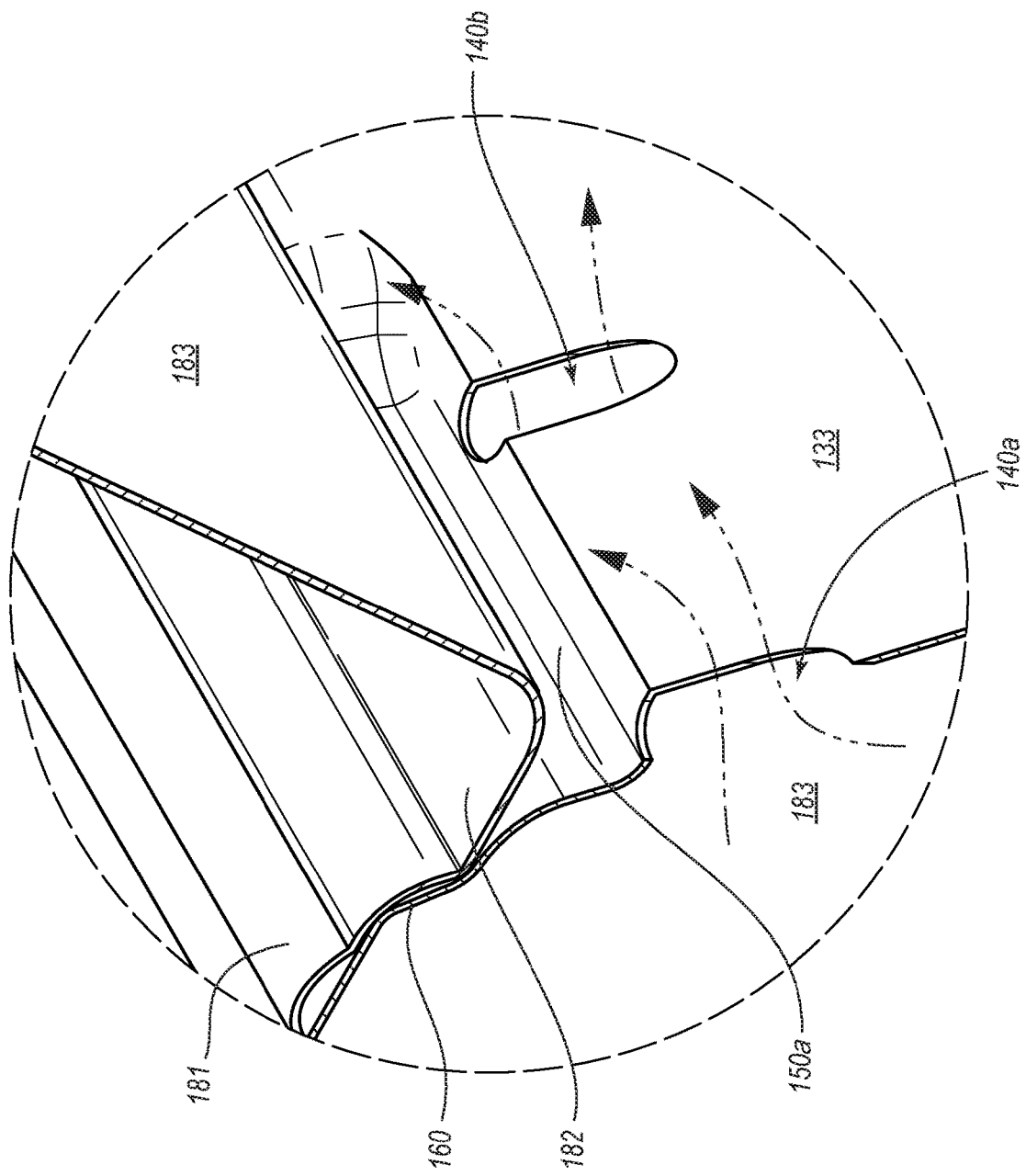
FIG. 7 is an enlarged perspective view of the section encircled at 7 of the stacked containers of FIG. 6.

With reference to FIGS. 6-7, the upper ends of vents 140*a* and 140*b* are located in a recess 150*a* in the sidewall 143 of lid 130 and the upper ends of vents 140*c* and 140*d* are located in a recess 150*b* in the sidewall 143. Vents 140*a-d* each extend through and along a length of the lid sidewall 143 and terminate at the respective recess 150*a-b*. The recesses 150*a-b* are generally oblong in shape and collinear with the lid platform 132, extending along a portion of the side of the lid 130. The recesses 150*a-b* within lid 130 may be located between the lid sidewall 133 and the top end 131 and also may be adjacent to the stacking structure, such as a stacking protrusion 160. Advantageously, the design of each recess 150*a-b* in the lid 130 as an oblong structure that is collinear with the lid platform 132, may ensure that the mechanical stability of the container is not compromised by each vent 140*a-d*, particularly when multiple closed containers are stacked vertically together. In some embodiments, each recess 150*a-b* is located in and is collinear with lid platform 132.

When two closed containers having stacking structures are stacked vertically, such as is illustrated in FIGS. 6-7, the placement of vents 140*a-b* and 140*c-d* within respective recesses 150*a-b* permit for the contents of both the lower and upper containers to remain vented while stacked, as the vents are not covered up or otherwise obstructed despite being in a stacked arrangement. When stacked, neither the stacking receptacle 190 nor base platform 182 of the base 180 of the upper container adversely affect the vents 140*a-b* or 140*c-d* of the lower container, and the contents of the lower container can continue venting.

A stacking structure, such as a stacking protrusion 160 or a stacking receptacle 190, may have four sides and cooperate with the recesses 150*a-b* such that the recesses 150*a-b* are adjacent to the stacking structure. For example, the lid stacking structure may have four sides and the recesses 150*a-b* may extend collinearly along one of the sides of the stacking structure, such as is illustrated in FIG. 3.

The stacking structure, in certain embodiments, may include a first length and the recess 150*a-b* may include a second length, and the length of the stacking structure may be greater than the length of the recess 190. In an embodiment, the stacking structure of the lid is a stacking protrusion 160 that has four sides forming a rectangular shape, and each side of the protrusion 160 has a length, and the recess 190 extends collinearly along one of the sides of the protrusion 160, the recess 190 also having a length that is less than the length of the side to which the recess 190 is adjacent.

As explained above, the lid 130 may include at least one vent, such as only one of vents 140a-b, and the lid 130 may also include a top end 131, a lid sidewall 133 extending from the top end 131, and recesses 150a-b that are located between the lid sidewall and the top end 131 and that is also adjacent to the stacking structure 160 of the lid 130. The vent 140 may extend from the lid sidewall 133 to the recess 150, whereby heat and/or moisture may be vented from the upper interior volume of the base to the external environment even when another container 100 is stacked on the top end 131 of the lid 130. In an embodiment, heat and/or moisture may be vented from the upper interior volume via the vent 140 when the container 100 is closed and a second closed container 100 is stacked on the top end 131 of the lid 130.

In the depicted embodiment, the lid 130 includes a first recess 150a and a second recess 150b between the lid sidewall 133 and the top end 131, with both the first and the second recesses 150a-b adjacent to the lid stacking structure 160 and extending within the lid platform 132. Also, in the depicted embodiment, a pair of vents 140a-b and 140c-d is present in each of the respective recesses 150a-b, the first recess 150a and the second recess 150b are opposite from each other, and the vents extend through and along the length of the lid sidewall and terminate in the recesses. In certain embodiments, the lid includes at least one vent in the lid sidewall that extends to a first recess, whereby heat and/or moisture may be vented from the upper interior volume even when another tri-fold container is stacked on the top end of the lid.

The container 100 may include a closure element 189. An embodiment of a closure element 189 is illustrated in FIGS. 2 and 3, comprising a tab and slot-type closure. The closure element 189 may be located on the side of the container opposite that of hinge 170 and/or be integrated with hinge 120. When the container 100 is closed, the lid tab 139 may be secured into base slot 188 to secure the lid 130 to the base 180. The size and design of the closure element 189 may vary. For example, the closure element may extend outward from the lid sidewall 133 and lid tab 139 may have an extended portion sufficiently long to permit the tab 139 to readily cooperate with base slot 188, such as illustrated in FIG. 3. Alternatively, the closure element may be integrated into the lid sidewall 133 with no change in slope of the lid sidewall 133 before the lid sidewall 133 intersects the flange 135 at the lid-base interface.

The design of two compartments within the vented tri-fold containers disclosed herein may vary, depending upon the expected food products to be packaged and/or its temperature. For example, an embodiment of a container having an upper interior volume that is smaller than the lower interior volume is shown in FIG. 8. With reference to FIG. 8, container 100 may advantageously include a moisture capture area ("M") in the upper interior volume that is bounded on three sides by lid sidewall 133, the divider flange 115, and the exterior ridge 113e of rim 113 of divider 110. The moisture capture area may, however, not be present in certain embodiments of the disclosed vented tri-fold containers. The moisture capture area is designed to capture any condensation that may collect on the interior of lid 130, including on the stacking protrusion 160, the lid platform 132, and/or lid sidewall 133, in order to draw it away from, and keep it separated from, the central area 112 of the divider 110 that contains a food product. In this manner, the food product placed in the upper compartment may avoid becoming soggy or damp in the presence of condensation that may form within the container.

Referring to FIG. 8, the height of the container 100 may be schematically represented as height $L_A$, with the height of the upper compartment represented as height $L_B$ and the height of the lower compartment represented as height $L_C$. In the embodiment shown in FIG. 8, the divider 110 of the container 100 has a central area 112 and a ridge 113 having a peak 113p, with the vertical distance from the top of the primary plane of central area 112 to the top of the peak 113p represented by height $L_D$ in the upper interior volume. In the lower compartment, the vertical distance from the divider flange 115 (resting upon the base connection interface 184 and abutting base flange 185) to the top of peak 113p is represented by height $L_E$.

Thus, for example, if the likely amount of condensation may be substantial for a specific food item due to its water content and/or high temperature, the height of the peak 113p on divider ridge 113 can be substantially higher than for a low-condensation food item, such that heights $L_D$ and/or $L_E$ are relatively high. Higher $L_D$ and $L_E$ value may increase the size of the moisture capture area ("M"). Similarly, if the likely amount of condensation is low, the height of the peak 113p on divider ridge 113 can be relatively low, such that $L_D$ and/or $L_E$ are relatively small, and the size of the moisture capture area may be comparatively small.

The height of the primary plane of the central area 112 of the divider 110 within the closed container may be varied to change the volume of the upper and lower compartments, but these volumes are limited by the total volume of the closed container. Thus, the heights $L_B$ and $L_C$ may vary but are limited by total height $L_A$. In certain embodiments, the height $L_A$ is between about 3 and about 10 inches, between about 4 and about 8 inches, between about 5 and about 6 inches, or about 5.5 inches. In some embodiments, the height of $L_B$ is between about 1 and about 4 inches, between about 1.5 and about 3 inches, or between about 2 and about 2.5 inches. In an embodiment, the height of C is between about 1 and about 5 inches, between about 1.5 and about 3.5 inches, between about 2 and about 3 inches, or between about 2.3 and about 2.9 inches.

The height of $L_D$, representing the vertical offset of the peak 113p of ridge 113 from the central area 112 of divider 110, may vary. In certain embodiments, the height $L_D$ is between about 0.1 and about 1 inch, between about 0.2 and about 0.5 inch, or about 0.3 inches.

The height of $L_E$, representing the vertical offset of the peak 113p of ridge 113 from the divider flange 115 of divider 110, may also vary. In certain embodiments, the height $L_E$ is between about 0.1 and about 2 inches, between about 0.2 and about 1 inch, between about 0.3 and about 0.8 inch, or about 0.5 inches.

The design of lid 130 can include different sidewall profiles, such as by having a gradually sloping lid sidewall 133 extending from the lid platform 132, or by having a near 90-degree angle between the lid platform 132 and a substantially vertical lid sidewall 133, such that M may have different volumes. The design of closure element 189 of container 100 may similarly affect the volume of M, such as if the closure element increases the horizontal distance between the divider ridge 113 and the lid sidewall 133.

In some embodiments, when the container is closed, the exterior side 113e of the ridge 113 of the divider 110, and the lid sidewall 133 of the lid 130 together define a moisture capture area within the upper interior volume of the container, to collect moisture and to retain the moisture separately from the central area 112 of the divider 110. In an embodiment, the moisture capture area of the container 100 has a bottom (that is, divider flange 115) that is further vertically offset from the peak 113p of the rim 113 of the divider 110, than the peak 113p of the rim 113 is vertically offset from the central area 112.

In some embodiments, the lid stacking structure may be a stacking receptacle that is vertically offset from the lid platform with the base including a stacking protrusion. As depicted in FIGS. 9A and 9B, a container 200 may include a stacking receptacle 290 of the lid 130, which may cooperate with a stacking protrusion 260 of a base 180 of a second container 200, and also form a stable stack when closed and to nest together when open. The container 200 may be circular in shape, as depicted in FIG. 9B.

The material used to form the vented tri-fold containers disclosed herein may be any suitable material. In an embodiment, the container may be formed of a polymeric foam, a thermoformed plastic, or a combination of a polymeric foam and a thermoformed plastic. Examples of suitable materials include polyethylene terephthalate (PET) and polypropylene (PP). Other materials suitable for forming the tri-fold containers disclosed herein include polystyrene (PS) including expanded PS and oriented PS, crystalline polyethylene terephthalate (CPET), amorphous polyethylene terephthalate (APET), high density polyethylene (HDPE), polyvinyl chloride (PVC), polycarbonate (PC), polyester, polyolefin, and foamed polypropylene. The materials used to form the vented tri-fold containers may be generally transparent or clarified, to allow a user to view the contents, or they may be opaque. The materials used to form any one section or element of the container, such as the lid or the base, may independently be the same as, or may be different from, the material used to form any other section, such as a hinge.

The material used to form the vented tri-fold containers disclosed herein may also include paper, aluminum and/or a fiber. Examples of fibers include a fiber derived from a plant or animal such as cotton, cellulose, bamboo, or silk, and fibers derived via a chemical process in the laboratory, such as polyamide, polyester, polyolefin and acrylic fibers. Paper and/or aluminum may be used to strengthen the container and/or to provide the container with improved heat resistance or durability.

As mentioned, the divider 110, lid 130, base 180, and the two hinges 120 and 170 may be integrally formed from a unitary piece of material. For example, in some embodiments the container may be formed from a single piece of thermoformed plastic. However, more than one material may also be used such as an embodiment where a different material is used for the hinges.

References to approximations are made throughout this specification, such as by use of the terms "about" or "approximately." For each such reference, it is to be understood that, in some embodiments, the value, feature, or characteristic may be specified without approximation. For example, where qualifiers such as "about," "substantially," and "generally" are used, these terms include within their scope the qualified words in the absence of their qualifiers. For example, where the term "substantially planar" is recited with respect to a feature, it is understood that in further embodiments, the feature can have a precisely planar configuration.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the preceding claims up to and including claim [x]," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed in accordance with 35 U.S.C. § 112 ¶ 6. Embodiments of the invention in which an exclusive property or privilege is claimed are defined as follows.

The invention claimed is:

1. A tri-fold container comprising:
   a base comprising a bottom end and a base sidewall extending from the bottom end;
   a divider;
   a lid comprising a vent, a top end, and a lid sidewall extending from the top end;
   a divider hinge connecting the lid and the divider; and
   a lid hinge connecting the base to the lid;
   wherein the lid cooperates with the divider to define an upper interior volume of the container when the container is in a closed configuration;
   wherein the base cooperates with the divider and the lid to define a lower interior volume of the container when the container is in a closed configuration,
   wherein the divider is between the upper and lower interior volumes of the container when the container is in a closed configuration;
   wherein the bottom end of the base comprises a stacking structure;
   wherein the top end of the lid comprises a stacking structure;

wherein each stacking structure is configured to be mated with a stacking structure of another tri-fold container to permit the container to be stacked with other tri-fold containers;

wherein the lid comprises a first recess between the lid sidewall and the top end and adjacent to the stacking structure of the lid; and wherein the vent in the lid extends from the sidewall to the first recess such that only the upper interior volume of the container is vented when the container is in a closed configuration;

whereby heat and/or moisture may be vented from the upper interior volume even when another tri-fold container is stacked on the top end of the lid.

2. The tri-fold container of claim 1, wherein the stacking structure of the lid fits in a friction-fit configuration with a stacking structure of a base of a second tri-fold container such that some force must be applied to separate them.

3. The tri-fold container of claim 1, wherein
the lid comprises a first recess between the lid sidewall and the top end and adjacent to the stacking structure of the lid and a second recess between the lid sidewall and the top end and adjacent to the stacking structure of the lid;
wherein the vent in the lid extends from the sidewall to the first recess;
wherein a second vent in the lid sidewall extends to the second recess; and
wherein the first recess and the second recess are opposite from each other.

4. The tri-fold container of claim 1, wherein the lid comprises a first recess between the lid sidewall and the top end and adjacent to the stacking structure of the lid,
wherein the stacking structure of the lid has four sides, and
wherein the first recess extends colinearly along one of the sides.

5. The tri-fold container of claim 1, wherein the lid comprises a first recess between the lid sidewall and the top end and adjacent to the stacking structure of the lid;
wherein the stacking structure of the lid has a length;
wherein the first recess has a length; and
wherein the length of the stacking structure is greater than the length of the first recess.

6. The tri-fold container of claim 1, wherein the stacking structure of the lid is a stacking protrusion and the stacking structure of the base is a stacking receptacle;
wherein the stacking protrusion of the lid has four sides forming a rectangular shape;
wherein each side of the stacking protrusion has a length;
wherein the lid comprises a first recess between the lid sidewall and the top end and adjacent to the stacking protrusion; and
wherein the first recess extends colinearly along one of the sides of the stacking protrusion and has a length that is less than the length of the side to which the first recess is adjacent.

7. The tri-fold container of claim 6, wherein the stacking protrusion has rounded corners; and
wherein the stacking protrusion of the lid fits in a friction-fit configuration with a stacking receptacle of a base of another tri-fold container, and
wherein the stacking receptacle of the base fits in a friction-fit configuration with a stacking protrusion of a lid of another tri-fold container.

8. The tri-fold container of claim 1, wherein the divider comprises a central area, a ridge, and a divider flange;
wherein the ridge has a peak between an interior side and an exterior side;
wherein the peak is vertically offset from the central area;
wherein the interior side of the ridge extends from and around the central area;
wherein the exterior side extends to the divider flange;
wherein the base sidewall extends from the bottom end to a base flange;
wherein, when the container is in a closed configuration, the divider flange abuts the lid flange and the lid flange abuts the base flange;
wherein, when the container is in a closed configuration, the exterior side of the ridge of the divider and the sidewall of the lid define a moisture capture area within the upper interior volume of the container to collect moisture and retain the moisture separately from the central area of the divider.

9. The tri-fold container of claim 8, wherein the moisture capture area has a bottom that is further vertically offset from the peak of the ridge than the ridge is vertically offset from the central area.

10. A tri-fold container comprising:
a lid comprising a top end and a lid sidewall extending from the top end;
a divider;
a base comprising a bottom end and a base sidewall extending from the bottom end;
a divider hinge connecting the lid to the divider; and
a lid hinge connecting the base to the lid;
wherein the lid cooperates with the divider to define an upper interior volume of the container when the container is in a closed configuration;
wherein the base cooperates with the divider and the lid to define a lower interior volume of the container when the container is in a closed configuration;
wherein the divider is between the upper and lower interior volumes of the container when the container is in a closed configuration,
wherein the bottom end of the base comprises a base platform around a stacking receptacle, which is vertically offset from the base platform;
wherein the top end of the lid comprises a lid platform around at least a majority of a stacking protrusion, which is vertically offset from the lid platform;
wherein the lid comprises a first recess in the lid platform that is configured such that when a second tri-fold container is stacked on the lid, the base platform of the second container extends over the first recess and abuts the lid platform;
wherein at least one vent extends through and along a length of the lid sidewall and terminates at the first recess such that only the upper interior volume of the container is vented when the container is in a closed configuration;
whereby heat and/or moisture may be vented from the upper interior volume via the vent when the tri-fold container is in a closed configuration and a second tri-fold container is in a closed configuration and is stacked on the top end of the lid.

11. The tri-fold container of claim 10, wherein the stacking protrusion of the lid fits in a friction-fit configuration with a stacking receptacle of a base of a second tri-fold container such that some force must be applied to separate them.

12. The tri-fold container of claim 10,
wherein the lid comprises a second recess in the lid platform;
wherein at least one vent extends through and along a length of the lid sidewall and terminates at the second recess; and
wherein the first recess and the second recess are opposite from each other.

13. The tri-fold container of claim 10, wherein the stacking protrusion of the lid has four sides and the first recess extends colinearly along a first side of the stacking protrusion.

14. The tri-fold container of claim 13, wherein the first side of the stacking protrusion of the lid has a length that is greater than a length of the first recess.

15. The tri-fold container of claim 10, wherein the stacking protrusion of the lid has a rectangular shape with rounded corners.

16. The tri-fold container of claim 10, wherein the base platform is wider than the lid platform.

17. The tri-fold container of claim 10, wherein the divider comprises a central area, a ridge, and a divider flange;
wherein the ridge has a peak between an interior side and an exterior side;
wherein the peak is vertically offset from the central area;
wherein the interior side of the ridge extends from and around the central area;
wherein the exterior side extends to the divider flange;
wherein the base sidewall extends from the bottom end to a base flange;
wherein, when the container is in a closed configuration, the divider flange abuts the lid flange and the lid flange abuts the base flange;
wherein, when the container is in a closed configuration, the exterior side of the ridge of the divider and the sidewall of the lid define a moisture capture area within the upper interior volume of the container to collect moisture and retain the moisture separately from the central area of the divider.

18. The tri-fold container of claim 1, wherein the base is integrally connected to the lid via the lid hinge and the lid is integrally connected to the divider via the divider hinge.

19. The tri-fold container of claim 10, wherein the base is integrally connected to the lid via the lid hinge and the lid is integrally connected to the divider via the divider hinge.

20. A tri-fold container comprising:
a base comprising a bottom end and a base sidewall extending from the bottom end to a base flange;
a divider;
a lid comprising a vent, a top end, and a lid sidewall extending from the top end;
a divider hinge connecting the lid and the divider; and
a lid hinge connecting the base to the lid;
wherein the lid cooperates with the divider to define an upper interior volume of the container when the container is in a closed configuration;
wherein the base cooperates with the divider and the lid to define a lower interior volume of the container when the container is in a closed configuration;
wherein the divider is between the upper and lower interior volumes of the container when the container is in a closed configuration and comprises a central area, a ridge, and a divider flange, wherein the ridge has a peak between an interior side and an exterior side, wherein the peak is vertically offset from the central area, wherein the interior side of the ridge extends from and around the central area, wherein the exterior side of the ridge extends to the divider flange, and wherein, when the container is in a closed configuration, the divider flange abuts the lid flange and the lid flange abuts the base flange;
wherein, when the container is in a closed configuration, the exterior side of the ridge of the divider and the sidewall of the lid define a moisture capture area within the upper interior volume of the container to collect moisture and retain the moisture separately from the central area of the divider;
wherein the moisture capture area has a bottom that is further vertically offset from the peak of the ridge than the ridge is vertically offset from the central area; and
wherein the vent in the lid extends from the lid sidewall toward the top end, whereby heat and/or moisture may be vented from the upper interior volume.

21. The tri-fold container of claim 20, wherein only the upper interior volume of the container is vented when the container is in a closed configuration.

22. The tri-fold container of claim 20, wherein, when the container is in a closed configuration, the moisture capture area is further bounded by the divider flange.

\* \* \* \* \*